US006842709B2

(12) United States Patent
Borg

(10) Patent No.: US 6,842,709 B2
(45) Date of Patent: *Jan. 11, 2005

(54) QUALITY MONITORING AND MAINTENANCE FOR PRODUCTS EMPLOYING END USER SERVICEABLE COMPONENTS

(75) Inventor: Michael Jonas Borg, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,636

(22) Filed: Dec. 1, 2003

(65) Prior Publication Data

US 2004/0117140 A1 Jun. 17, 2004

Related U.S. Application Data

(63) Continuation of application No. 09/877,985, filed on Jun. 8, 2001, now Pat. No. 6,687,634.

(51) Int. Cl.[7] .......................... G01D 18/00; G06F 19/00

(52) U.S. Cl. .......................... 702/85; 702/90; 702/105; 347/19; 358/504

(58) Field of Search .......................... 702/85, 90, 105; 347/19, 101, 1, 5; 358/504, 1.14, 1.15

(56) References Cited

U.S. PATENT DOCUMENTS 6,016,204 A * 1/2000 Budnik et al. ............ 358/1.14

* cited by examiner

*Primary Examiner*—John Barlow
*Assistant Examiner*—Hien Vo

(57) ABSTRACT

A method and apparatus for monitoring the quality and performance of a product that utilizes end user serviceable components and consumables. In illustrative embodiments, a calibration procedure is employed to determine when and if sub-standard third party replacement components are employed. If such a component is detected, a notification is made to the end user or a service provider. Under certain conditions, the product can be disabled. In another embodiment, electronic labels are employed within the replaceable components. The electronic labels are used to determine the source and quality of the replaceable components, and to interface to sensors which can monitor the consumption of consumables, or for other purposes. Warranty and service costs can be established based on the utilization of the present teachings.

24 Claims, 3 Drawing Sheets

QUALITY MONITORING AND MAINTENANCE FOR PRODUCTS EMPLOYING END USER SERVICEABLE COMPONENTS

CROSS-REFERENCE TO RELATED APPLICATION

This is a Continuation of U.S. patent application Ser. No. 09/877,985 filed Jun. 8, 2001 by Michael Jonas Borg and entitled QUALITY MONITORING AND MAINTENANCE FOR PRODUCTS EMPLOYING END USER SERVICEABLE COMPONENTS which has now issued as U.S. Pat. No. 6,687,634.

BACKGROUND OF THE INVENTION

1. Field of the Invention

The present invention relates to systems and methods for effecting product quality control. More specifically, the present invention relates to systems and methods for maintaining overall product quality during a product's operation and support, including warranty and contract service.

2. Description of the Related Art

Many products are assembled from a complex array of components that are consumable and/or subject to wear. One such product is a computer laser printer for which toner is a consumable component. Laser printers and copiers include image drums, transfer belts, fuser, and air filters that wear, or degrade, with use. During the life cycle of such a product, it typically becomes necessary for the end user to replace worn or consumed components. End users typically have a selection of competitively available replacement parts, original equipment manufacturer (OEM) and third party suppliers to choose from. Consequently, during such a product's life cycle, third party components are often installed into, or used in conjunction with, the manufacturer's products.

However, in many systems, a complex relationship between individual components and subsystems is carefully contemplated to provide a level of performance that meets product specifications throughout the operational life thereof. Unfortunately, as is well known in the art, third party products are often not designed and manufactured to the same standards as "factory authorized" components. These substandard components often lead to a diminution in the performance of the system and necessitate claims for service on the product. Where warranty service or service under a contract, is provided by the OEM or its designated agent, the OEM or its agent must often bear an unfair cost burden.

Original product suppliers have attempted to deal with the aforementioned problems with warranty and service contracts written to exclude coverage where sub-standard replacement parts or consumables are used. However, even if this technique is employed, it does not eliminate the cost of sending service personnel to the end user site. And, it can be difficult to determine when sub-standard components are, or have been, used. Also, it is not unheard of for end users to employ the use of substandard components leading to the need for a service call, only to substitute an original quality component just prior to arrival of the service technician.

Another aspect of this problem is the case where the end user replaces consumables into the original quality container, thus making it very difficult to determine when sub-standard quality consumables have been used. This often arises when end users "drill and fill" toner cartridges in laser printers and liquid ink cartridges in inkjet printers.

Thus there is a need in the art for systems and/or methods for allowing original equipment manufacturers, service providers and end users to determine if substandard components have been substituted for OEM equipment laser in inkjet printers and copiers and other devices and systems.

SUMMARY OF THE INVENTION

The need in the art is addressed by the methods and apparatuses taught by the present invention. A method of monitoring the performance of a product that has user serviceable components is taught. This method includes the steps of performing initial calibration procedure to produce a first performance metric, and then performing a subsequent calibration procedure to produce a second performance metric. Then, comparing the second performance metric with the first performance metric, and outputting a performance factor indicative of a change in performance resulting from a change in the user serviceable components. If a change is user serviceable components occurred between the two calibrations, it can thus be detected and monitored. In a refinement of this method, a further step of sending a notification that the performance factor has crossed a predetermined threshold is employed. In a further refinement, the step of disabling the product if the performance factor has a crossed a predetermined threshold is added. In a further refinement, the initial calibration procedure is performed prior to the time a user serviceable component is replaced. In a further refinement, the initial calibration procedure is performed at the time of manufacture of the product. In a further refinement, the subsequent calibration procedure is performed when one of the user serviceable components is replaced. In a further refinement, the step of communicating the performance factor to a service provider is added. In a further refinement, the communicating step is accomplished via the Internet.

The present invention also teaches a method of monitoring the performance of an product, where some of the originally installed user serviceable components include an electronic label. This method includes the steps of performing initial calibration procedure to produce a first performance metric, and detecting the presence of a third party user serviceable component by identifying the absence of a proper electronic label. Then, performing a subsequent calibration procedure to produce a second performance metric, and comparing the second performance metric with the first performance metric. Finally, outputting a performance factor indicative of a change in performance resulting from the use of the third party user serviceable component.

The present invention also teaches a method of identifying the presence of third party replacement consumables in an product, where some of the originally installed user serviceable components include an electronic label. This method includes the steps of reading first information indicative of an amount of consumption of a consumable from the electronic label of one of the certain originally installed user serviceable components, and storing the first information. Then, subsequently repeating the reading step to produce second information indicative of an amount for consumption, and comparing the second information with the first information thereby identifying an increase in the amount of the consumable. Next, outputting a replacement indicator indicative of an increase in the quantity of the consumable.

The present invention also teaches a method of identifying invalid service claims for an product having user serviceable components. This method comprises the steps of performing initial calibration procedure to produce a first performance metric, and performing a subsequent calibration procedure to produce a second performance metric, then, comparing the second performance metric with the first performance metric, and outputting a performance factor indicative of a reduction in performance resulting from a change in the user serviceable components with a third party user serviceable component. Finally, determining the validity of a subsequent service claim according to the performance factor. In a refinement of this method, the step of establishing the cost of providing service for the product according to the determined validity of the service claim is added.

The present method also teaches a method of identifying invalid service claims for an product, in the case where some of the originally installed user serviceable components include an electronic label. This method includes the steps of performing initial calibration procedure to produce a first performance metric, and detecting the presence of a third party user serviceable component by identifying the absence of a proper electronic label. Then, performing a subsequent calibration procedure to produce a second performance metric, and comparing the second performance metric with the first performance metric. Next, outputting a performance factor indicative of a change in performance resulting from the use of the third party user serviceable component, and determining the validity of a subsequent service claim according to the performance factor. In a refinement of this method, the step of establishing the cost of providing service for the product according to the determined validity of the service claim is added.

The present invention also teaches a product having user serviceable components that is enabled to monitor its own performance. The product has a means for performing an initial calibration procedure to produce a first performance metric, and a means for performing a subsequent calibration procedure to produce a second performance metric. The product also has a means for comparing the second performance metric with the first performance metric, and a means for outputting a performance factor indicative of a change in performance resulting from a change in the user serviceable components. In a refinement of this product, the means for outputting further provides a notification when the performance factor has crossed a predetermined threshold. In a further refinement of this product also has a means for disabling the product if the performance factor has a crossed a predetermined threshold. In a further refinement, the means for performing an initial calibration procedure operates at the time of manufacture of the product. In a further refinement, the means for performing the subsequent calibration procedure when one of the user serviceable components is replaced. In a further refinement, the product further has a means for communicating the performance factor to a service provider. In a further refinement, the means for communicating interfaces to the Internet. In a further refinement, the product is a printer.

The present invention also teaches a product that has user serviceable components, some of which include electronic labels, where the product is capable of monitoring its own performance. The product includes a means for performing initial calibration procedure to produce a first performance metric, and a means for detecting the presence of a third party user serviceable component by identifying the absence of a proper electronic label. It also includes a means for performing a subsequent calibration procedure to produce a second performance metric, and a means for comparing the second performance metric with the first performance metric. In addition, a means for outputting a performance factor indicative of a change in performance resulting from the use of the third party user serviceable component.

The present invention also teaches a product that has user serviceable components, some of which have electronic labels, and that has consumables in the user serviceable components. The product includes a means for reading first information indicative of an amount of consumption of a consumable from the electronic label of one of certain originally installed user serviceable components, and a memory for storing the first information. Also, a means for subsequently reading second information indicative of an amount for consumption of the consumable from the electronic label, and a means for comparing the second information with the first information thereby identifying an increase in the amount of the consumable. And, a means for outputting a replacement factor indicative of an increase in the quantity of the consumable.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
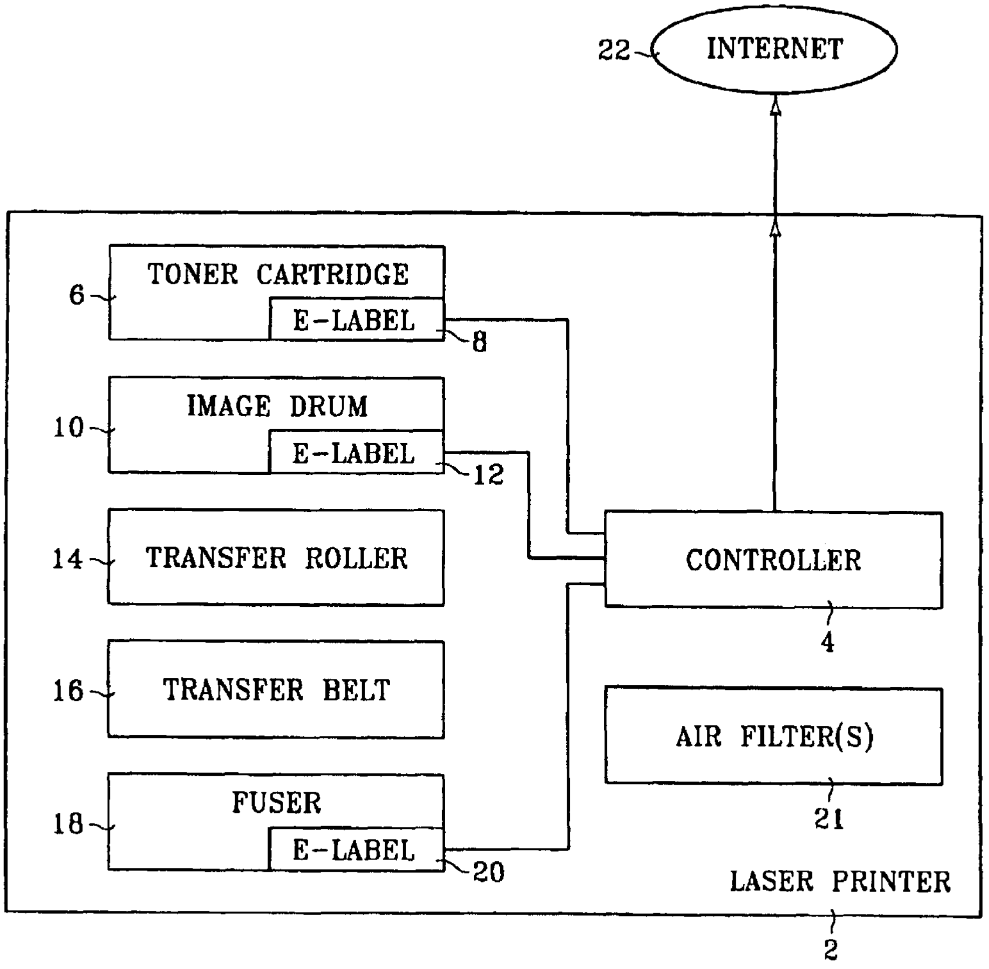
FIG. 1 is a functional block diagram of an illustrative embodiment of the present invention.

An illustrative embodiment of the present invention contemplates its application to laser and ink jet printers and copiers and other such devices. An exemplary device is illustrated in FIG. 1, which is a functional block diagram of a modern laser printer 2. A microprocessor-based controller 4 resides in the printer 2 and serves to control the general operation of the printer 2. Such microcontrollers are understood by those of ordinary skill in the art, and typically comprise memory and executable software, which embodies the functionality of the machine. Much of the functionality of the present invention is made operative by the installation of software into the controller 4.

Within a laser printer are a number of user serviceable and replaceable components. These include a toner cartridge 6, which contains the consumable toner material (not shown). During operation of the laser printer, toner is dispersed upon the paper media, and is thus consumed. Therefore, from time to time, the end user must replace the toner cartridge in order to replenish the consumed toner. The manufacturer of the laser printer 2 typically offers replacement toner cartridges 6 that end users can purchase to replace the depleted toner. As noted herein before, third party suppliers manufacture and sell "compatible" toner cartridges and are available to end users in the marketplace. Also, third party suppliers gather empty original manufacturer toner cartridges and refill them with non-original manufacturer toner and then resell them back into the marketplace. Thus, refilled toner cartridges are available the marketplace that are virtually indistinguishable from the original manufacturer toner cartridges.

Another user serviceable component in a modern laser printer 2 is the image drum 10. The toner from the toner cartridge 6 is transferred to the image drum 10 in the laser printing operation, as is understood by those of ordinary skill in the art. While the image drum is not depleted per se, it has a finite useful life expectancy and thus the image drum 10 is replaced by end users from time to time. As in the case of toner cartridges, there are third party manufacturers that offer "compatible" replacement images drums 10.

Other user serviceable components in a laser printer 2 are the transfer roller 14 and transfer belt 16 which are utilized in applying the toner image to the paper during the printing operation, as is understood by those or ordinary skill in the art. These components wear over their useful lives, and thus the end user may need to replace them from time to time. Third party suppliers offer "compatible replacement transfer rollers 14 and transfer belts 16 in the marketplace.

Another user serviceable component is the fuser 18, which applies heat and pressure to the paper after the toner image has been transferred thereto to fuse the image to the paper. The fuser 18 also has a limited service life and thus end users may need to replace the fuser 18 from time to time. Again, third party "compatible" fusers 18 are available in the marketplace.

There are other user serviceable components in modern laser and inkjet printers. For example, in a laser printer 2, there may be one or more air filters 21 that control the movement of dust, toner, and other particulate and gaseous materials into and out of the printer 2.

While third party suppliers typically maintain that the user serviceable components that they offer are "compatible", real world experience has demonstrated that they are often not of equal quality and performance. As noted above, the development of a printer includes a system approach where subtle interactions among the components are carefully considered. In addition, the physical tolerance and quality of the materials employed in third party products may not be as accurate or of as high a quality standard. Thus, as third party user serviceable components are installed into the originally manufactured product, the performance of the product declines. At some point, the performance declines to an unacceptably low level, at which time the end user may call for service on the product. The cost of such service may be covered under a warranty or under a service contract with the original supplier or its service agent. If the required service results from the use of sub-standard third party components, then there exists an inequity to the service provider. The end user may believe that the third party components are "compatible", so there is a potential for the development of mistrust in the mind of the end user when the service provided declines to provide service, or declines to cover the cost of service due to the presence of sub-standard third party components.

It should be noted that some third party components are more problematic than others. And that some third party components may even be of equal quality to the originally installed components. Thus, it is useful to not only determine the presence of third party end user replaceable components and consumables, but also to determine the level of compatibility and quality of such components.

According to the present invention, the replaceable components, such as the toner cartridge 6, image drum 10, transfer roller 14, transfer belt 16, fuser 18, air filters 21, and other user serviceable components are detected or checked by the controller 4 to determine if a non-manufacturer product has been used. This information can then be used in accordance with one or more of several options. These options include giving a warning to the end user of the presence of third party components and/or an indication of degradation in performance of the product resulting therefrom.

Also, an indication of the presence of third party components or a reduction in the quality of the product can be stored in a memory for later recall by service personnel. According to the present invention, such an indication can be communicated outside the product. In one embodiment, the product incorporates an interface to the Internet, as illustrated by item 22 in FIG. 1 so that the presence of substandard third party components can be determined before a service call is dispatched to the end user location.

One technique employed according to the present invention for assessing the ongoing quality of performance of a product involves one or more calibrations. In the laser printer illustrative embodiment, a calibration process is run at the time of manufacture to establish certain criteria respecting the performance of the product. These criteria are called metrics. This same calibration procedure can be run after a user serviceable component is replaced. The initial calibration serves as a point of reference for the second calibration, or re-calibration. The calibration is accomplished by printing a test image to the image drum, and then employing sensor to accomplish an analysis of the image as it reside on the image drum. Quality factors include, but are not limited to, the lightness/darkness and thickness of lines, uniformity of the image, banding, and so forth. The controller then accomplishes the calibration and attempts to adjust the laser to make the image consistent with the original, baseline, calibration. Assuming it can calibrate to the base line, then the replaced components meet a minimum quality threshold and are good enough. This approach is also used along with other sensors and software routines to test the quality of parts to determine whether they meet a minimum standard. If so, the system continues to function. If not, then the product may flag the components as unacceptable, communicate the deficiency to the end user, the service provider or other entity.

In extreme situations, in order to preserve the quality and integrity of the product as well as the other related system components, the controller may even shut the system down until the problem is corrected or other components are damaged. Alternatively, the decision as to minimum quality could be given to the end user to decide. This would allow the end user to elect to use the inferior components, but to do so without further support under warranty or a service contract, as applicable.

Another test that can be performed in the printer illustrative embodiments is one for drive gear play, or rattling, which is indicative of sub-standard or worn components, and manifests itself and image banding. Banding can be assessed with the aforementioned calibration process. Also, diagnostic functions can be run either locally or though remote connection when new end user serviceable components are installed to determine if they compromise performance and quality. This would also include print speed determination.

Another aspect of the present invention is illustrated in FIG. 1. This has to do with electronic labels, also called "E-labels", which can be deployed within certain end user serviceable components. In FIG. 1, the toner cartridge 6 comprises electronic label 8. The image drum 10 comprises electronic label 12. The fuser 18 comprises electronic label 20. Of course, any component could comprise and electronic label, as contemplated under the present invention. The choice to add such a label is a design consideration balancing cost, value, and other factors. An electronic label is an integrated circuit or similar device, that is affixed to the end user serviceable components and may or may not interface to the controller 4 in the printer 2, or other product into which the present invention is applied. The electronic label is also applied in other applications, and is generally detailed in Hewlett Packard U.S. patent application Ser. No. 09,820, 457, filed Apr. 28, 2001, by M. Borg et al. for SYSTEM AND METHOD FOR UTILIZING PRINTING DEVICE DATA IN A CUSTOMER SERVICE CENTER, the contents of which are hereby incorporated by reference thereto.

The electronic label provides one or more of several advantages as contemplated under the present invention. First, it electronically identifies the end user serviceable component as an original manufacturer product, or a product of certified quality. Thus, a service technician can test the electronic label and determine the quality of the component. If the controller in the product is electrically interfaced to the electronic label, then the product itself is operable to determine the quality of the end user serviceable component. Further, if the product is interfaced to an external network, such as the Internet, it is enabled to communicate directly with a remote host, such as a qualified service provider, and can communicate information about the quality of components placed into service within the product. The implementation of the electronic label opens several other possibilities as well. At the time a component is installed an alert can be communicated to the end users, through a display on the product, that the component is not an original manufacturer component. Similarly, if the product is under warranty or service contract, and alert can be generated indicating the effect such component will have on the validity of future claims against those contracts. Also, this information can be communicated to the remote host for similar alert and handling form a centralized point.

Electronic labels within components can also be coupled to internal sensors used to monitor the wear and/or consumption of a component. For example, in the case of a laser printer, the electronic label 12 on the image drum 10 can monitor and report on the drum wear and thickness over time. When a minimum threshold is reached, the system can so report. In the toner cartridge 6, the electronic label 8, can monitor the amount of toner consumed. This latter example has another particular advantage as contemplated under the present invention. This has to do with the refilling of toner cartridges. As the original toner is consumed, the electronic label monitors the decrease in available toner. Then, if the toner is replenished, it is noted, and reported that the refill action has occurred, potentially indicating the use of a sub-standard quality consumable. Also, reuse of such a component means that the total wear on the device accumulates over time. This can produce banding in the image, which results from too much play in the drive gears. Thus, it can be determination that the gears are of sub-standard quality, by reason of wear or otherwise.

In addition, those of ordinary skill in the art will appreciate that additional sensors can be added to each product, which are designed to detect the kinds of problems associated with sub-standard or worn components, and thus products can be enabled to react to such situations. Respecting the case where low quality or unclean filters are in service, a dust sensor could be employed, for example.

Once a product is enabled to monitor its performance, as noted above, this information can be utilized in a variety of manners. These include, but are not limited to, a notification to the end users, such as a pop-up display indicating the source of a problem of potential problem. Also included is an estimation of the degree of impact, including a printed report, of the adverse component. This information can be linked via the Internet to the original manufacturer, or its designated agent, so that preventative maintenance actions, or warnings to the effect on warranty and service can be generated to the end user of such products. And, corrective recommendations can be made.

The information can also be used to set warranty and service repair levels and cost. Service and warranty can be based on no cost, or low cost, when only original manufacturer end user serviceable components and consumables are utilized. Higher service and warranty costs when third party components of lower quality are utilized.

Figure 2:
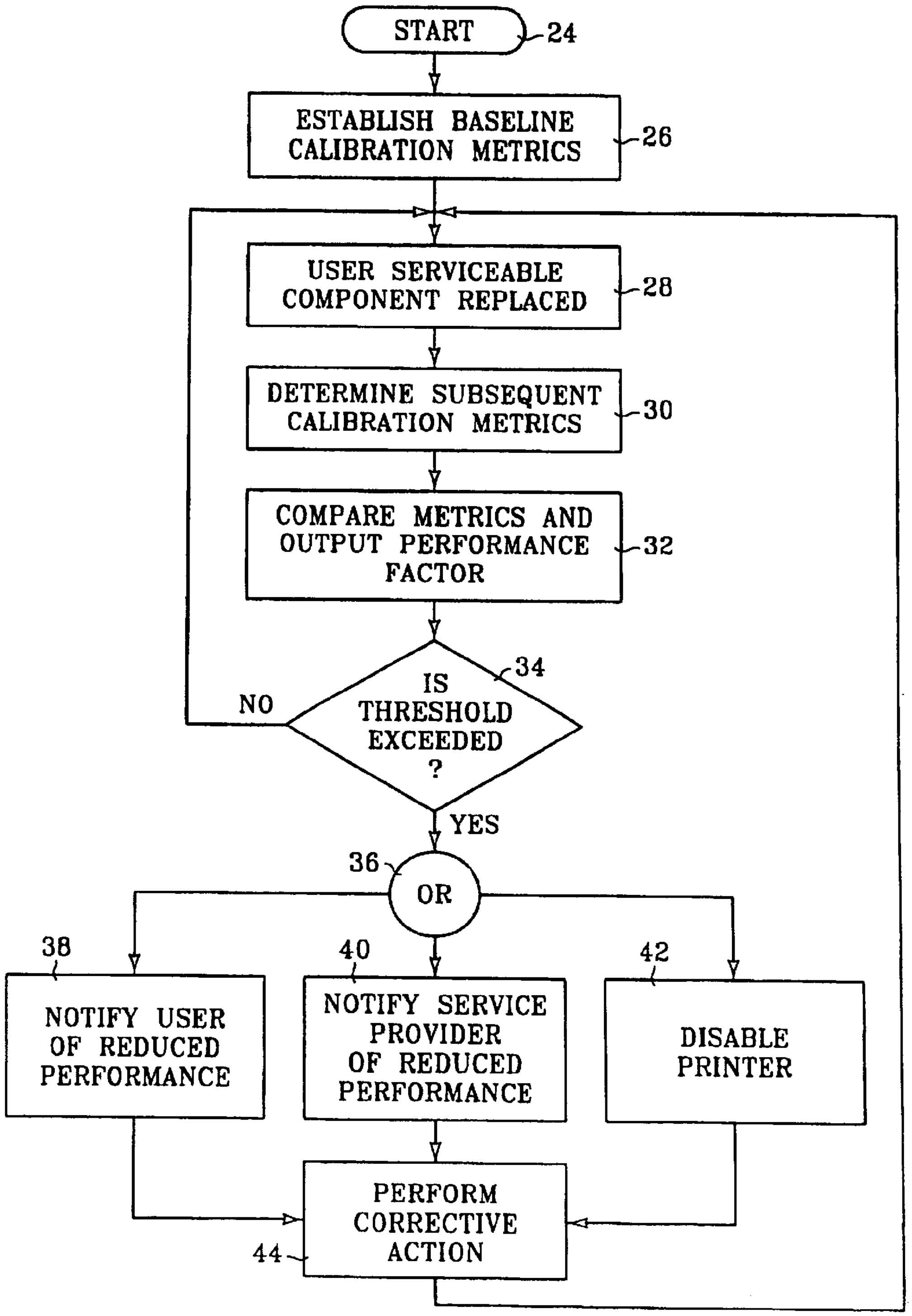
FIG. 2 is a flow diagram of an illustrative embodiment of the present invention.

Reference is now directed to FIG. 2, which is a flow diagram of an illustrative embodiment of the present invention. The process starts at step 24 and proceeds to step 26 where a baseline calibration is made to generate one or more performance metrics. This step can be executed at the time of manufacture, or other time when it is known or expected the quality and performance are in accordance with the original manufacturer levels. Performance metrics include those noted above, such as print quality, uniformity, speed, and so forth. During the useful life of the product, end user serviceable components may be changed, and this is indicated at step 28 in FIG. 2. After this time, or when otherwise commended, the product executes a subsequent calibration procedure to determine a second metric at step 30. It is to be understood that step 30 could be based on demand, an event, or occur periodically. At step 32, a comparison is made between the first and subsequent calibration metrics. This comparison generates a performance factor, which is indicative of the level of performance and quality of the product. At step 34, the performance factor is compared to a threshold level to determine if that threshold has been crossed. If the threshold has not been crossed, flow returns to step 28 and recirculates as described above.

On the other hand, at step 34, if the threshold has been crossed, the flow continues to step 36, where one of three alternatives may be employed, as determined by design considerations and market forces. First, a notification may be made to the end user of the reduction in quality or performance, as indicated in step 38. This allows the end user to elect to take a corrective action. Alternative, step 40 could be employed where the performance factor is communicated to the service provider. This allows the service provider to either suggest or take a corrective action, or to adjust future service costs accordingly. The third alternative is illustrated at step 42, which is to disable the product, a printer in this illustrative embodiment. This allows the original manufacture to establish a threshold of performance below which the product will not be allowed to drop. Or, it could be employed to prevent serious damage to other components or the entire product. Regardless of which alternative is selected, at step 44 a corrective action is taken and flow recirculates to step 28, awaiting the next replacement of a user serviceable or consumable component.

Figure 3:
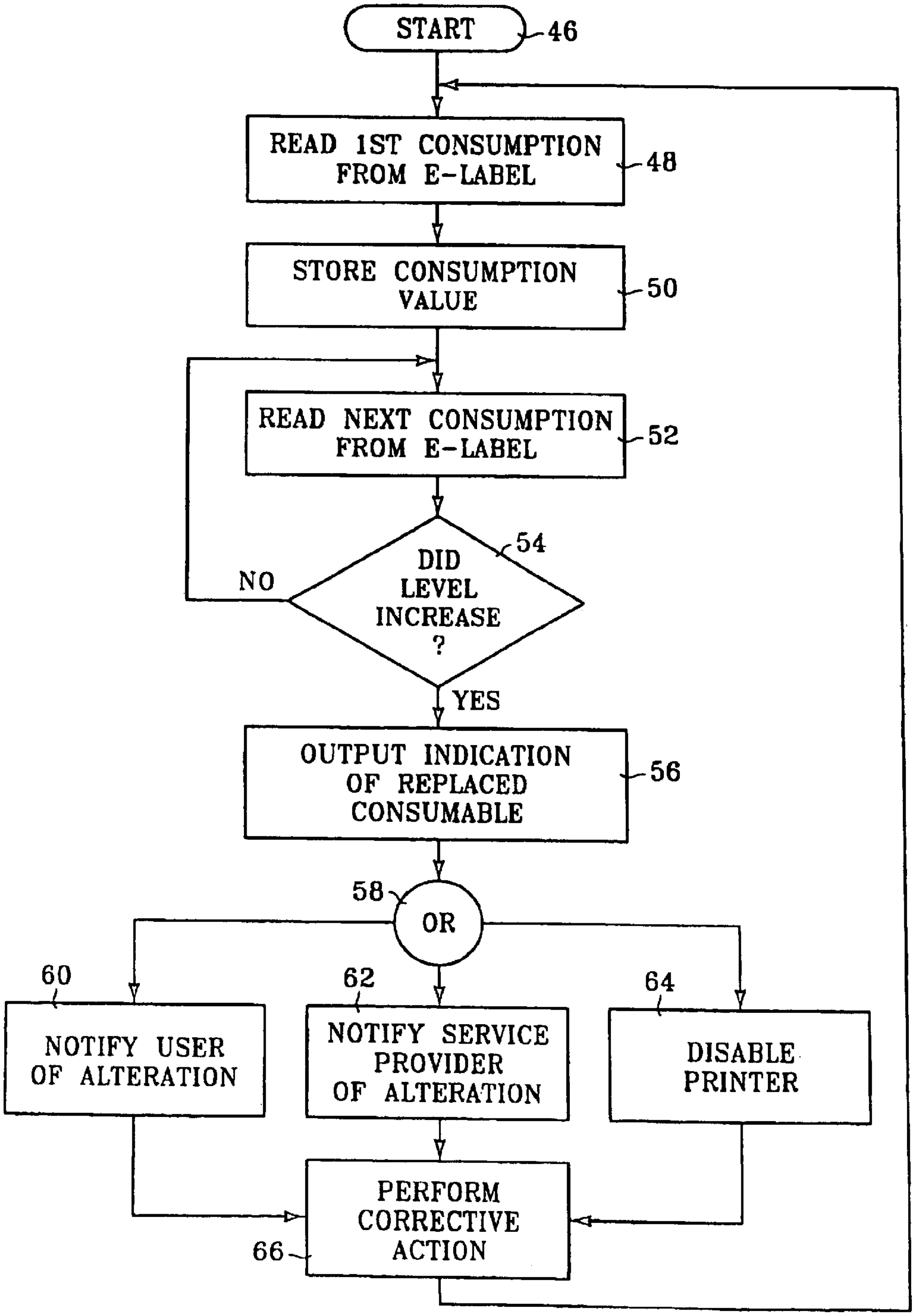
FIG. 3 is a flow diagram of an illustrative embodiment of the present invention.

FIG. 3 is a flow diagram of another illustrative embodiment of the present invention. The process starts at step 46 and proceeds to step 48 where a first consumption level is read for a consumable in a product. In one illustrative embodiment, this occurs through use of the electronic label in a toner cartridge. At step 50, that level is stored for later recall. Later in time, at step 52, the consumption level is read again. At step 54 as test is performed to indicate whether the level has increased. This indicates a replenishment of the consumable. If there has been no increase, flow recirculates to step 52 for a later subsequent test. On the other hand, if at step 54 the level did increase, an output indicative of a replaced consumable is generated at step 56. This is analogous to the performance factor discussed with respect to FIG. 2. Again, in FIG. 3, three alternatives are available. The first alternative, at step 60 is to notify the user of the alteration, which can be indicative of a decrease in performance. The second alternative is to notify the service provider, as illustrated in step 62. The third alternative is to disable the product, a printer in this illustrative embodiment, at step 64. Again, the corrective action is taken at step 66, then flow recirculates to step 48 where the process begins anew.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A method for monitoring the performance of an apparatus having user serviceable components, comprising the steps of:

performing initial calibration procedure to produce a first performance metric;

performing a subsequent calibration procedure to produce a second performance metric;

comparing said second performance metric with said first performance metric, and outputting a performance factor indicative of a change in performance resulting from a change in the user serviceable components.

2. The method of claim 1 further comprising the step of sending a notification that said performance factor has crossed a predetermined threshold.

3. The method of claim 1 further comprising the step of disabling the apparatus if the performance factor has a crossed a predetermined threshold.

4. The method of claim 1 wherein said initial calibration procedure is performed prior to the time a user serviceable component is replaced.

5. The method of claim 1 wherein said initial calibration procedure is performed at the time of manufacture of the apparatus.

6. The method of claim 1 wherein said subsequent calibration procedure is performed when one of the user serviceable components is replaced.

7. The method of claim 1 further comprising the step of communicating said performance factor to a service provider.

8. The method of claim 7 wherein said communicating step is accomplished via the Internet.

9. A method for monitoring the performance of an apparatus comprising the steps of:

performing initial calibration procedure to produce a first performance metric;

detecting the presence of a third party user serviceable component by identifying the absence of a predetermined electronic label;

performing a subsequent calibration procedure to produce a second performance metric;

comparing said second performance metric with said first performance metric, and outputting a performance factor indicative of a change in performance resulting from the use of said third party user serviceable component.

10. A method of identifying the presence of third party replacement consumables in an apparatus the method comprising the steps of:

reading first information indicative to an amount of consumption of a consumable from an electronic label for an originally installed user serviceable component;

storing said first information;

subsequently repeating said reading step to produce second information indicative of an amount for consumption, and comparing said second information with said first information thereby identifying an increase in the amount of the consumable;

outputting a replacement indicator indicative of an increase in the quantity of said consumable.

11. A method of identifying invalid service claims for an apparatus having user serviceable components, comprising the steps of:

performing initial calibration procedure to produce a first performance metric;

performing a subsequent calibration procedure to produce a second performance metric;

comparing said second performance metric with said first performance metric;

outputting a performance factor indicative of a reduction in performance resulting from a change in the user serviceable components with a third party user serviceable component, and determining the validity of a subsequent service claim according to said performance factor.

12. The method of claim 11 further comprising the step of establishing the cost of providing service for the apparatus according to said determined validity of the service claim.

13. A method of identifying invalid service claims for an apparatus, wherein certain originally installed user serviceable components include an electronic label, the method comprising the steps of:

performing initial calibration procedure to produce a first performance metric;

detecting the presence of a third party user serviceable component by identifying the absence of a proper electronic label;

performing a subsequent calibration procedure to produce a second performance metric;

comparing said second performance metric with said first performance metric;

outputting a performance factor indicative of a change in performance resulting from the use of said third party user serviceable component; and determining the validity of a subsequent service claim according to said performance factor.

14. The method of claim 13 further comprising the step of establishing the cost of providing service for the apparatus according to said determined validity of the service claim.

15. An apparatus having user serviceable components enabled to monitor its own performance, the apparatus comprising:

means for performing an initial calibration procedure to produce a first performance metric;

means for performing a subsequent calibration procedure to produce a second performance metric;

means for comparing said second performance metric with said first performance metric; and means for outputting a performance factor indicative of a change in performance resulting from a change in the user serviceable components.

16. The apparatus of claim 15 wherein said means for outputting further provides a notification when said performance factor has crossed a predetermined threshold.

17. The apparatus of claim 15 further comprising a means for disabling the apparatus if said performance factor has a crossed a predetermined threshold.

18. The apparatus of claim 15 wherein said means for performing an initial calibration procedure operates at the time of manufacture of the apparatus.

19. The apparatus of claim 15 wherein said means for performing said subsequent calibration procedure when one of the user serviceable components is replaced.

20. The apparatus of claim 15 further comprising a means for communicating said performance factor to a service provider.

21. The apparatus of claim 20 wherein said means for communicating interfaces to the Internet.

22. The apparatus of claim 15 wherein said apparatus is a printer.

23. An apparatus having user serviceable components, the apparatus being operable to monitor its own performance and comprising:

means for performing initial calibration procedure to produce a first performance metric;

means for detecting the presence of a third party user serviceable component by identifying the absence of a predetermined electronic label;

means for performing a subsequent calibration procedure to produce a second performance metric;

means for comparing said second performance metric with said first performance metric; and means for outputting a performance factor indicative of a change in performance resulting from the use of said third party user serviceable component.

24. An apparatus having user serviceable components, certain of which have electronic labels, and having consumables in the user serviceable components, the apparatus, comprising:

means for reading first information indicative of an amount of consumption of a consumable from an electronic label for at least one originally installed user serviceable components;

a memory for storing said first information;

means for subsequently reading second information indicative of an amount for consumption of said consumable from said electronic label;

means for comparing said second information with said first information thereby identifying an increase in the amount of the consumable; and means for outputting a replacement factor indicative of an increase in the quantity of said consumable.

* * * * *